July 5, 1949.                J. SNEED                    2,474,961
                BRAKE CONTROL MECHANISM AND STEERING
                       GEAR CONTROL THEREFOR
Filed Sept. 17, 1945                              6 Sheets-Sheet 2

INVENTOR.
JOHN SNEED
BY
ATTORNEYS

INVENTOR.
JOHN SNEED
BY *Whittemore Hulbert & Belknap*
ATTORNEYS

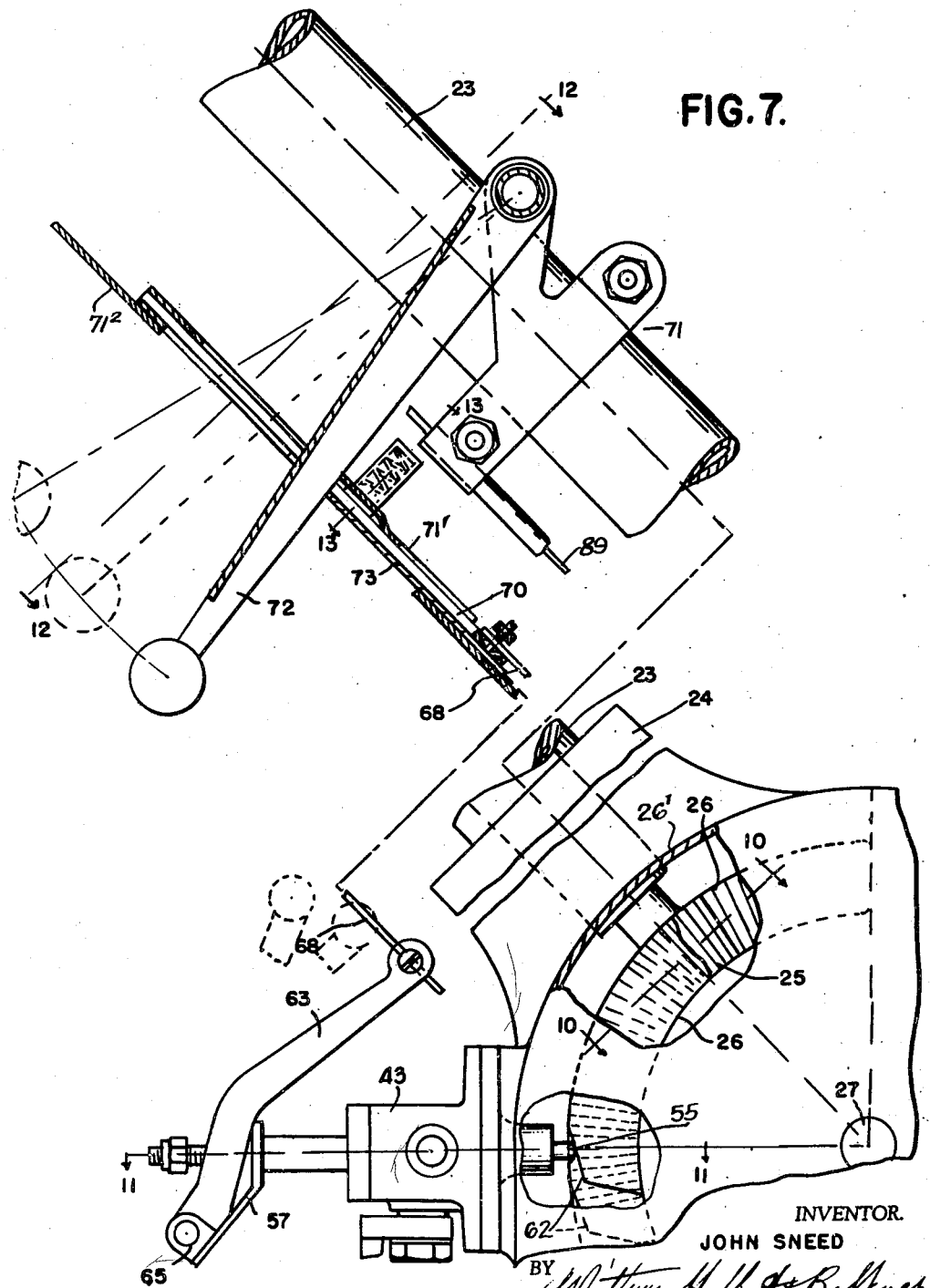

July 5, 1949.                     J. SNEED                    2,474,961
                BRAKE CONTROL MECHANISM AND STEERING
                        GEAR CONTROL THEREFOR
Filed Sept. 17, 1945                                6 Sheets-Sheet 5
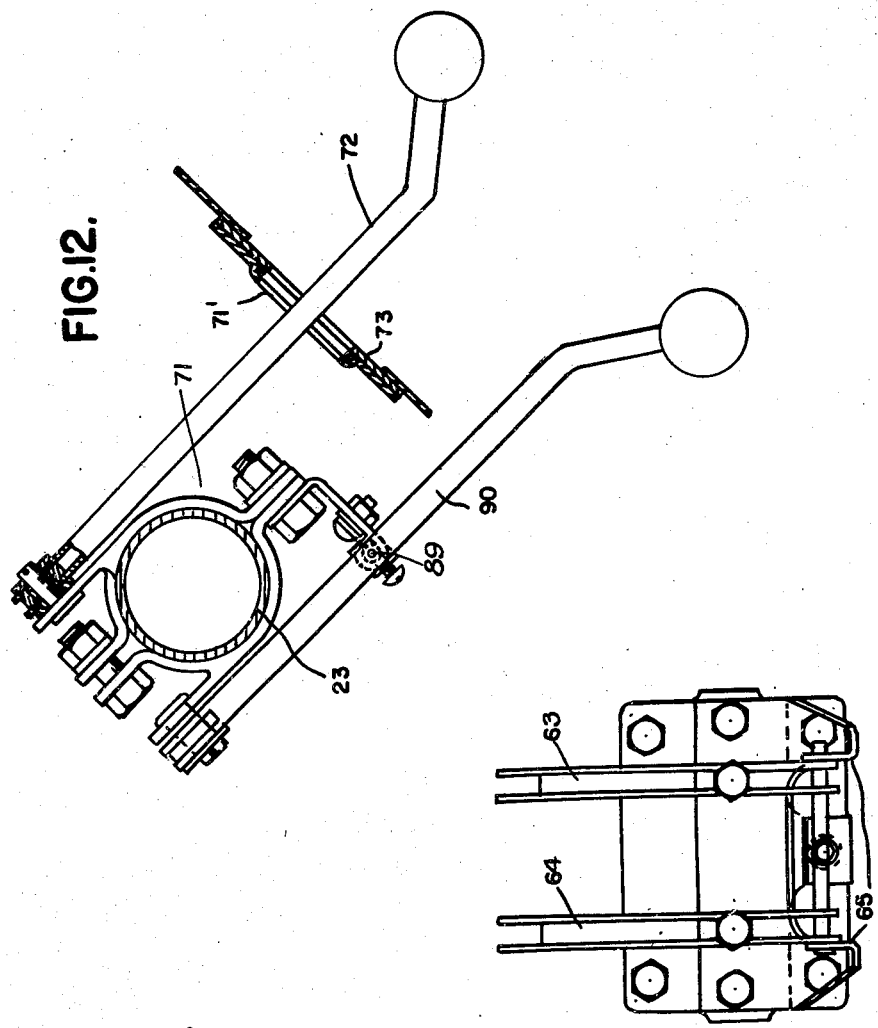
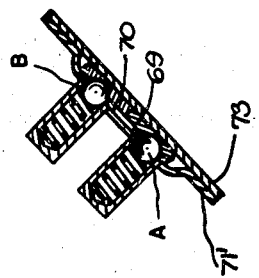
INVENTOR.
JOHN SNEED
BY
ATTORNEYS

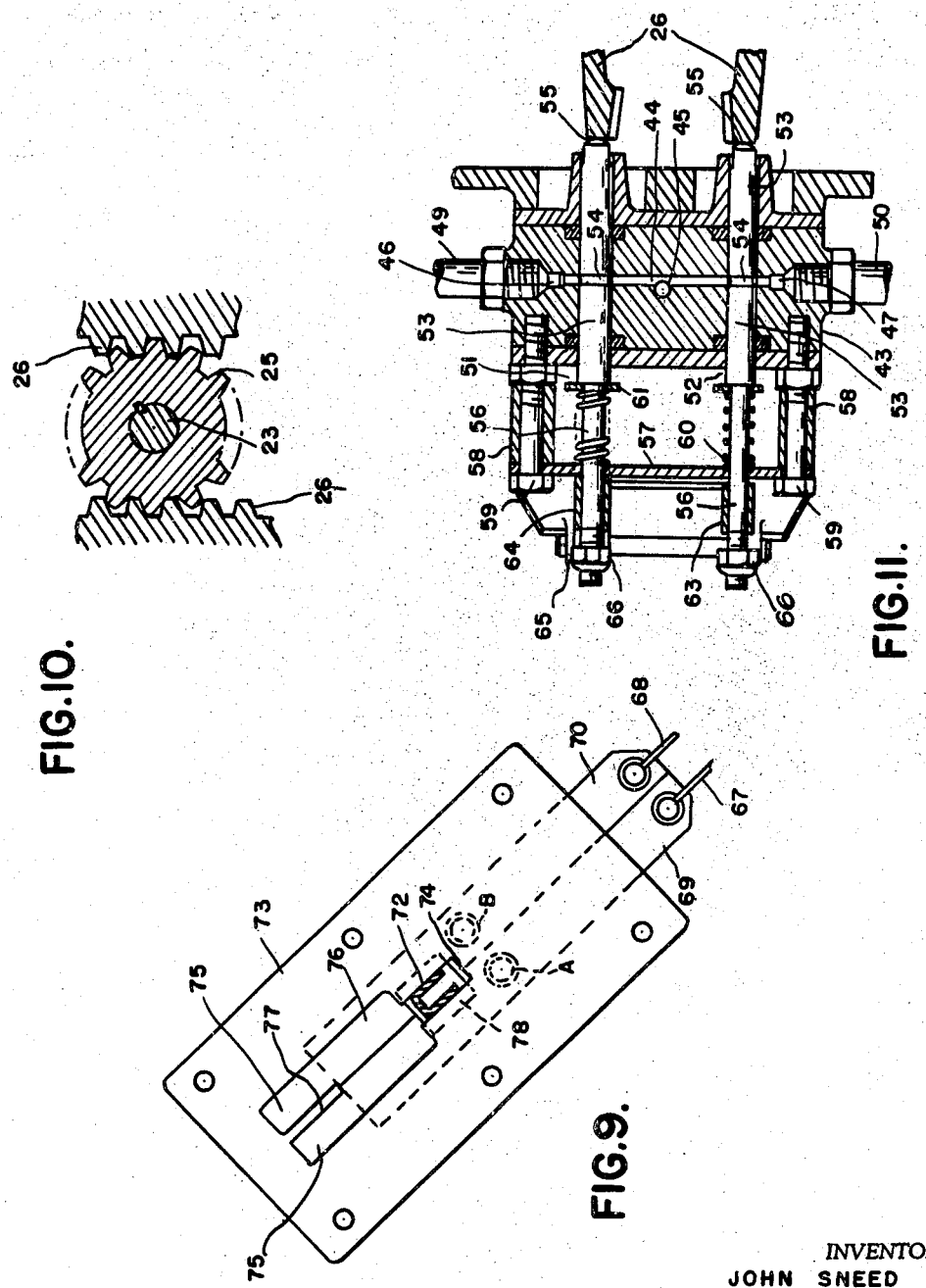

Patented July 5, 1949

2,474,961

UNITED STATES PATENT OFFICE 2,474,961

BRAKE CONTROL MECHANISM AND STEERING GEAR CONTROL THEREFOR

John Sneed, Detroit, Mich., assignor to Kelsey-Hayes Wheel Company, Detroit, Mich., a corporation of Delaware Application September 17, 1945, Serial No. 616,740

5 Claims. (Cl. 180—18)

The invention relates to brake systems and refers more particularly to mechanisms for controlling the brakes of a vehicle.

The invention has for one of its objects to provide an improved mechanism for controlling the brakes of right hand and left hand driving members of a vehicle in a manner to effect desirable braking action and also to aid in steering the vehicle.

The invention has for other objects to provide a brake control mechanism comprising a device which controls the connection between the brakes of the vehicle and the manually operable member for applying the brakes and the movement of which can be controlled by the gear sectors of the steering mechanism of the vehicle; and to provide a brake control mechanism with a manually adjustable member which is in addition to and controls the device.

The invention has for a further object to so construct the control mechanism that the manually adjustable member is movable to different positions in one of which the application of either the right hand brake or the left hand brake is controlled by the steering mechanism; in another of which the application of both the right hand and the left hand brakes may occur independently of the steering mechanism; and in still another of which the application of either the right hand brake or the left hand brake is predetermined and may occur independently of the steering mechanism.

These and other objects of the invention will become apparent from the following description, when taken in connection with the accompanying drawings, in which Figure 1 is a plan view, partly broken away and in section, of a vehicle employing a brake control mechanism embodying the invention;

Figure 1:
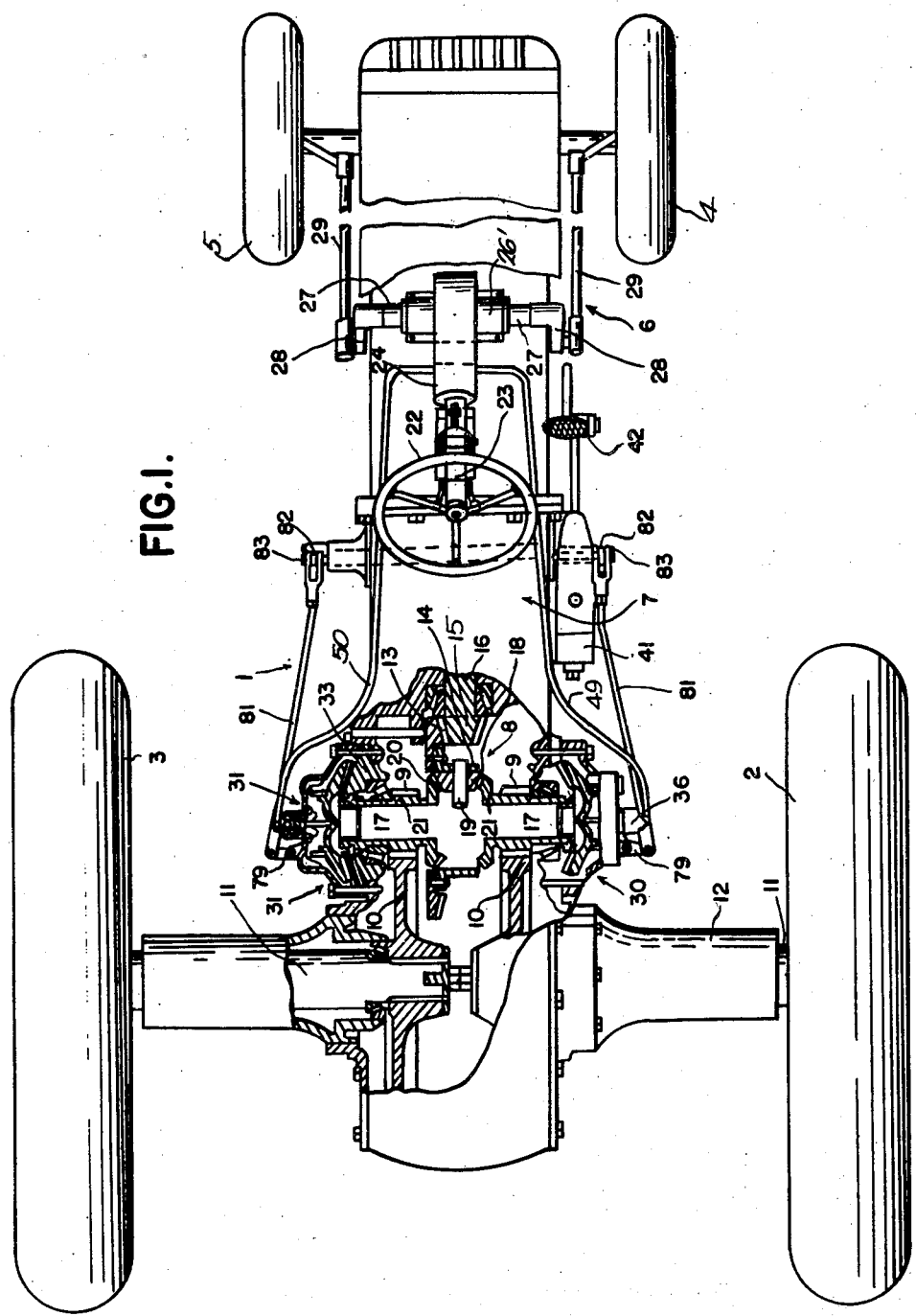
Figure 2:
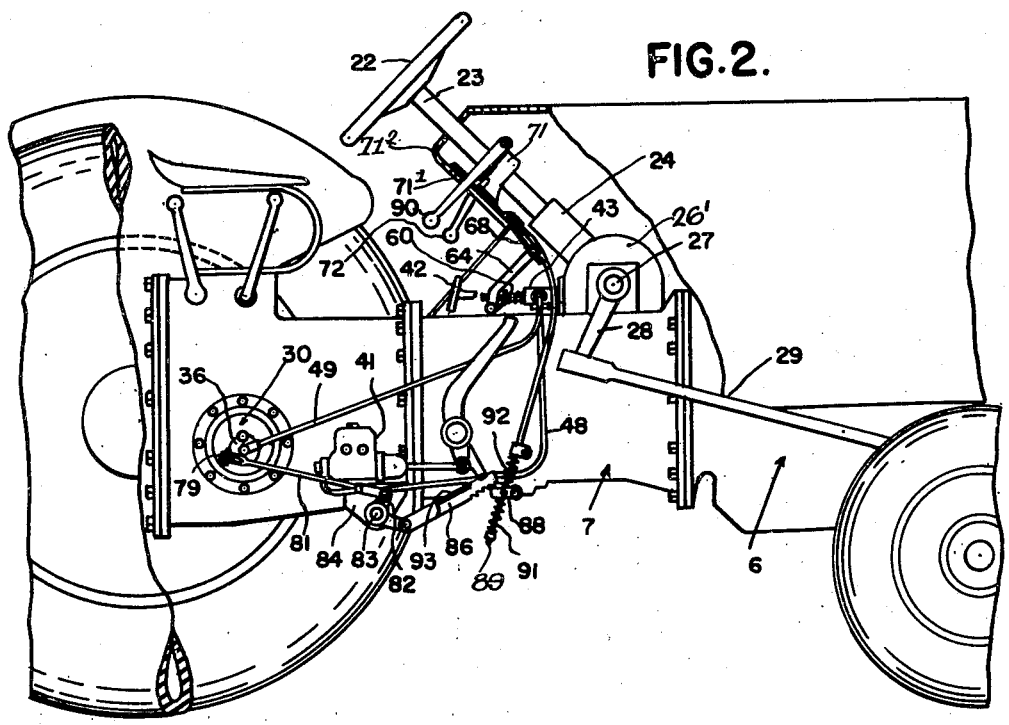
Figure 2 is a side elevation, partly broken away.
Figure 3:
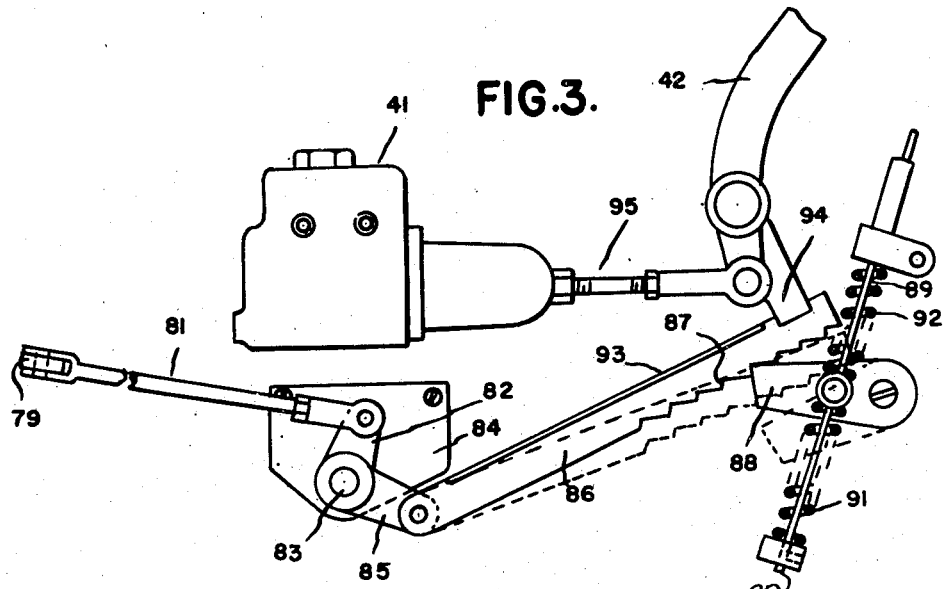
Figures 3 and 4 are enlarged views of portions of Figure 2.
Figure 4:
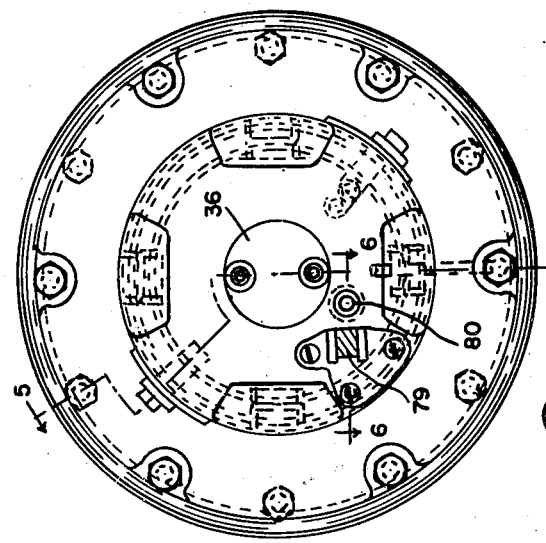
Figure 6:
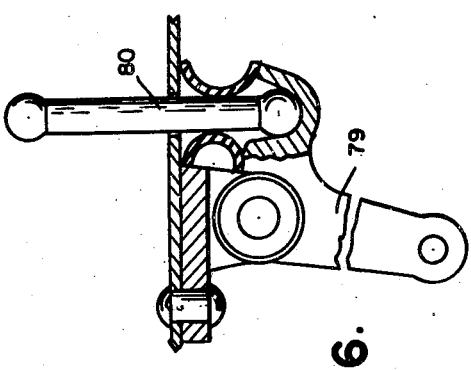
Figure 5:
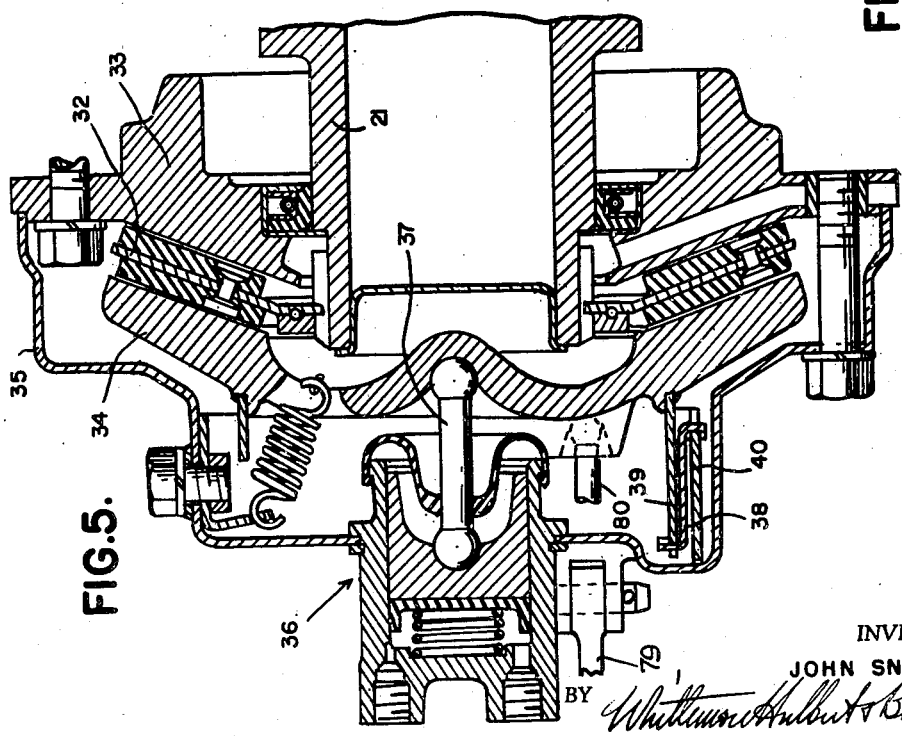

Figures 5 and 6 are cross sections on the lines 5—5 and 6—6, respectively, of Figure 4;

Figure 7 is an enlarged view, partly broken away, of a portion of Figure 2;

Figures 8 and 9 are elevations of portions of Figure 7;

Figures 10, 11, 12 and 13 are cross sections on the lines 10—10, 11—11, 12—12 and 13—13, respectively, of Figure 7.

As shown in the present instance, the vehicle is a tractor having the frame 1, the right hand and the left hand rear driving wheels 2 and 3, respectively, and the right and left hand front dirigible wheels 4 and 5, respectively. The rear wheels are adapted to be driven by the engine 6 through suitable change-speed gearing 7, suitable differential gearing 8, driven pinions 9, and driven gears 10 in mesh with the driven pinions and suitably secured to the inner ends of the shafts 11 which are journaled in the rear axle housing 12 and have secured to their outer ends the rear driving wheels. The engine and the housings for the change-speed and differential gearings preferably form parts of the tractor frame.

The differential gearing 8 comprises the ring gear 13 mounted upon the spider 14 and driven by the driving pinion 15 upon the propeller shaft 16. The spider has the axially aligned oppositely extending stub shafts 17. The differential gearing also comprises the bevel pinions 18 journaled on the angularly spaced radial pins 19 carried by the spider and the bevel gears 20 in mesh with the bevel pinions 18 and mounted on and preferably integral with the hollow shafts 21 which are journaled in a part of the housing for the differential gearing. Each hollow shaft has journaled therein one of the stub shafts 17 and has secured thereto preferably integrally one of the driven pinions 9.

The front wheels are steered by suitable mechanism comprising the steering wheel 22, the steering stem 23 connected to the steering wheel and journaled in the steering column 24, and the bevel pinion 25 secured to the steering stem and meshing with the bevel gear sectors 26 to each of which is secured the stub shaft 27 having mounted at its outer end the arm 28 connected by the drag link 29 to a steering knuckle of one of the front dirigible wheels. The pinion and gear sectors are located in the housing 26'.

The service brake mechanism for the tractor is of the hydraulic type and comprises the brakes 30 and 31 at the right hand and left hand sides of the tractor and operating through the driven pinions 9, driven gears 10 and shafts 11 to brake the rear right and left hand driving wheels 2 and 3, respectively, it being noted that the driven pinions, driven gears and shafts serve to drive the rear wheels. Each brake comprises the rotatable brake member 32 slidably mounted on an end of and rotatable with one of the hollow shafts 21. Each brake also comprises the stationary brake member 33 and the third brake member 34 which has limited rotation and is located at the outer side of the rotatable brake member and opposite the stationary brake member. The stationary brake member is a part of the housing for the differential gearing. Each brake also comprises the cage 35 fixedly secured to the differential gearing housing and carrying the fluid pressure operated actuator 36 having the piston rod 37 engaging the brake member 34 substantially axially thereof.

Each brake is also preferably provided with means for increasing the pressure of the brake members against each other after their friction faces have been initially engaged by the operation of the fluid pressure operated actuator. As shown, the means comprises the tension links 38 extending between the concentric inner and outer rings 39 and 40, respectively. The inner ring abuts the brake member 34 and the outer ring abuts the cage 35 and the links have a predetermined width such that when the brake member 34 is urged against the rotatable brake member 32 and the latter in turn is urged against the stationary brake member 33 the brake member 34 has a limited rotation and causes the links to swing and contact at their diagonally opposite corners with the rings 39 and 40, thereby urging the brake member 34 in a direction to effect an increased braking effort.

The brake mechanism also comprises a source of fluid pressure which, in the present instance, is a master cylinder 41 manually operable by means of the foot pedal 42.

To control the application of the brakes 30 and 31 upon depressing the foot pedal 42, I have provided mechanism which is movable to different positions in one of which the application of either the right hand brake or the left hand brake is controlled by the steering mechanism, in another of which the application of both brakes at the same time may occur independently of the steering mechanism, and in still another of which the application of either the right hand brake or the left hand brake is predetermined and may occur independently of the steering mechanism. The control mechanism comprises a valve device, cams on the gear sectors, and manually adjustable mechanism for selectively controlling the valve device.

The valve device, shown in detail in Fig. 11, comprises the housing 43 having the chamber 44 provided with the ports 45, 46 and 47. The ports communicate respectively with the master cylinder 41 and the right hand and left hand fluid pressure operated actuators 36 through the conduits 48, 49 and 50. The valve device also comprises the substantially parallel rods 51 and 52 forming valves for closing the ports 46 and 47, respectively. Each of these valves has the cylindrical body portion 53 provided with the annular groove 54 adapted to register with the associated port to provide communication between this port and the valve chamber. Each valve has the rounded inner end portion 55 which projects beyond the valve housing and also has the reduced shank portion 56 at its outer end which extends beyond the housing and through the bar 57 secured to the valve housing by the spacers 58 and the bolts 59. For normally urging each of the valves inwardly, there is the coil spring 60 encircling the shank portion 56 and abutting the collar 61 at the outer end of the body portion 53 and the bar 57.

Each gear sector 26 is formed, as shown in Fig. 7, with the cam 62 on its outer periphery which is engageable with the rounded inner end portion 55 of the associated valve, the valve housing 43 being mounted on the pinion and gear sector housing 26' to align the valves with the gear sectors.

The manually adjustable means or mechanism for selectively controlling the valve device comprises the levers 63 and 64 pivotally mounted at their lower ends upon the ears 65 extending from the bar 57. The levers are furcated so that the shank portions 56 of the valves 51 and 52 respectively pass through the levers 64 and 63 intermediate their ends. 66 are abutments in the form of nuts threaded upon the outer ends of the shank portions 56 and adapted to extend across between the furcations of the levers to be engaged thereby. 67 and 68 are Bowden wires connected to the free upper ends of the levers 64 and 63, respectively, and also to the lower ends of the plungers 69 and 70, respectively. The plungers 69 and 70 are longitudinally slidable in the housing 71' carried by the dash 71² of the tractor. 71 is a support carried by the steering column 24 below the steering wheel 22. This support has pivotally connected thereto the manually actuable lever 72 which extends through the housing 71' and may be swung about its pivot to thereby move either or both of the plungers 69 and 70 and, as a result, swing either or both of the levers 63 and 64. The housing 71' carries the plate 73 formed with a specially shaped opening, as shown in Fig. 9, through which the lever 72 extends. The opening has the lower portion 74 which is of a width to comfortably receive the lever 72, the upper portions 75 each of a width to comfortably receive the lever 72, and the intermediate portion 76 having a width such that its lateral edges align with the outer lateral edges of the upper portions. The upper portions are separated by the projection 77. The plungers 69 and 70 are formed with the openings 78, each being of a width to comfortably receive the lever 72. These openings face in opposite directions with the opening in each plunger facing the other plunger. The construction is such that when the lever is in its lowermost position and extending through the lower portion 74 of the opening in the plate it also extends through portions of both openings 78 in the two plungers. In this position of lever 72 both levers 63 and 64 are in positions with their upper ends lowered and with clearance between the intermediate portions of the levers and the nuts 66 allowing the valves 51 and 52 to move inwardly under the influence of the coil spring 60 as controlled by the cams 62 upon the gear sectors. When the lever 72 is in an intermediate position and extending through the intermediate portion 76 of the opening in the plate, both plungers 69 and 70 will occupy an intermediate position, as will also the levers 64 and 63, at which time these latter levers contact the nuts 66 and positively hold the valves 51 and 52 from moving inwardly under the action of the coil spring 60 and in positions placing the chamber 44 in communication with the ports 46 and 47 irrespective of the steering mechanism. In the third and uppermost position of the lever 72, it will be noted that the lever to reach this position must be swung slightly either to the right or to the left, in which case it is disengaged from either the left or right plunger 69 and 70, respectively, and fully engaged with the other plunger to move the other plunger to its uppermost position, which through one of the Bowden wires 67 and 68 and either the lever 64 or the lever 63 moves either the one valve 51 or the other valve 52 outwardly against the force exerted by its coil spring 60 to close either the port 46 or the port 47 and hold the valve in this position irrespective of the steering mechanism.

The plungers 69 and 70 are resiliently held in their adjusted positions by means of the spring-pressed balls A and B, respectively, the balls and springs being located in housings upon the housing 71' (Fig. 13).

The brakes 30 and 31 may also be mechanically applied and held in applied position when they are to be used as parking brakes. As shown, 79 are bell cranks, there being one for each brake, pivotally mounted on the cage 35 and adapted to operate through the rod 80 upon the brake member 34 to urge the same toward the brake members 32 and 33. 81 are links pivotally connected to the bell cranks and also to the arms 82 which are clamped to the shaft 83. The shaft is journaled in brackets 84 secured to and depending from the tractor frame. 85 is another arm clamped to the shaft 83 and pivotally connected to the link 86 which is inclined upwardly and forwardly and has the upper end portion of its lower edge formed with the teeth 87 for engagement by the pawl 88. This pawl is pivotally mounted upon the tractor frame and is adapted to be swung about its pivot by the Bowden wire 89 which is connected to the lever 90 pivotally mounted upon the housing 71' and extending adjacent to the lever 72. The wire yieldably holds the pawl in position by suitable means, such as the coil springs 91 and 92 encircling the wire and engaging abutments secured to the wire and also an abutment secured to the pawl. The link 86 has the flange 93 at its upper edge and the upper end of this flange forms an abutment for engagement by the lug 94 upon the lower part of the foot pedal 42 when the foot pedal is depressed and when the wire 89 is in a position holding the pawl 88 yieldably in the position shown by full lines. With this arrangement of pawl, the link 86 will be held in adjusted position holding the brakes applied. However, by longitudinally moving the wire and swinging the pawl downwardly to the position shown by dotted lines, the foot pedal will clear the link. It will be noted that the master cylinder 41 is adapted to be operated by the foot pedal 42 by means of the piston rod 95 which is pivotally connected to the lower part of the foot pedal.

What I claim as my invention is:

1. A control mechanism for the brakes of righthand and lefthand driving members of a vehicle having steering mechanism including gear sectors, a housing for the gear sectors, a source of fluid pressure and fluid pressure operated actuators for the brakes, said control mechanism comprising a valve housing mounted on the gear sector housing and having a chamber communicating with the source of fluid pressure, conduits between said chamber and the actuators for placing said chamber in communication with the actuators, movable valve means in said valve housing for controlling the communication through said conduits between said chamber and the actuators, means on the gear sectors for selectively controlling movement of said valve means in accordance with the direction of turning of the steering mechanism, and manually adjustable means for also selectively controlling movement of said valve means.

2. A control mechanism for the brakes of righthand and lefthand driving members of a vehicle having steering mechanim including gear sectors, a housing for the gear sectors, a source of fluid pressure and fluid pressure operated actuators for the brakes, said control mechanism comprising a valve device mounted on the gear sector housing and operatively connected to the source of fluid pressure and actuators and controllable by the gear sectors for selectively controlling the communication between the source of fluid pressure and the actuators, in accordance with the direction of turning of the steering mechanism, and manually adjustable means for also selectively controlling said valve device.

3. A control mechanism for the brakes of righthand and lefthand driving members of a vehicle having steering mechanism including gear sectors, a housing for the gear sectors, and a manually operable member and means for operatively connecting said member to the brakes to actuate the latter, said control mechanism comprising a device mounted on the gear sector housing for selectively controlling said means for operatively connecting said member to the brakes in accordance with the direction of turning of the steering mechanism and controllable by the gear sectors, and manually adjustable means for also selectively controlling said device.

4. A control mechanism for the brakes of righthand and lefthand driving members of a vehicle having steering mechanism including a pair of gear sectors, a housing for the gear sectors, a source of fluid pressure and righthand and lefthand fluid pressure operated actuators for the brakes, said control mechanism comprising a valve housing mounted on the gear sector housing and having a chamber and a port leading from said chamber and in communication with the source of fluid pressure and a pair of ports leading from said chamber and in communication with the actuators, a valve for closing each of the ports in communication with the actuators, a cam on each gear sector for controlling the movement of one of said valves in accordance with the direction of turning of the steering mechanism, and manually adjustable means for selectively controlling the movement of said valves.

5. A control mechanism for the brakes of righthand and lefthand driving members of a vehicle having steering mechanism including a pair of gear sectors, a housing for the gear sectors, a source of fluid pressure and righthand and lefthand fluid pressure operated actuators for the brakes, said control mechanism comprising a valve housing mounted on the gear sector housing and having a chamber and a port leading from said chamber and in communication with the source of fluid pressure and a pair of ports leading from said chamber and in communication with the actuators, a valve for closing each of the ports in communication with the actuators, a cam on one gear sector controlling the valve for the port in communication with the righthand brake actuator and providing for closing of the valve when the gear sector is turned a predetermined degree in making a left turn, a second cam on the other gear sector controlling the valve for the port in communication with the lefthand broke actuator and providing for closing of the last mentioned valve when the last mentioned gear sector is turned a predetermined degree in making a right turn, and manually adjustable means movable to positions providing for controlling of said valves by said cams, positively holding said valves from closing, and closing either of said valves.

JOHN SNEED.

REFERENCES CITED

The following references are of record in the file of this patent:

UNITED STATES PATENTS

| Number | Name | Date |
|---|---|---|
| 404,472 | Dunn | June 4, 1889 |
| 2,331,214 | Milster | Oct. 5, 1943 |